(12) United States Patent
Yarabolu et al.

(10) Patent No.: US 12,355,893 B2
(45) Date of Patent: Jul. 8, 2025

(54) CROSS CHAINED AGGREGATED HASH TOKEN VALIDATION SYSTEM

(71) Applicant: Bank of America Corporation, Charlotte, NC (US)

(72) Inventors: Vijay Kumar Yarabolu, Hyderabad (IN); Gowthaman Sundararaj, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 232 days.

(21) Appl. No.: 18/169,362

(22) Filed: Feb. 15, 2023

(65) Prior Publication Data

US 2024/0275607 A1 Aug. 15, 2024

(51) Int. Cl.
*H04L 9/32* (2006.01)
*H04L 9/06* (2006.01)
*G16Y 30/10* (2020.01)

(52) U.S. Cl.
CPC .......... *H04L 9/3242* (2013.01); *H04L 9/0618* (2013.01); *H04L 9/3213* (2013.01); *G16Y 30/10* (2020.01)

(58) Field of Classification Search
CPC ................................ H04L 9/3242; H04L 9/50
See application file for complete search history.

(56) References Cited

U.S. PATENT DOCUMENTS

| | | | |
|---|---|---|---|
| 9,785,369 B1 * | 10/2017 | Ateniese | ............... G06F 3/0659 |
| 9,942,235 B2 | 4/2018 | Bagasra | |
| 10,812,521 B1 | 10/2020 | Sharifi Mehr | |
| 10,924,466 B2 | 2/2021 | Biyani et al. | |
| 10,979,231 B2 | 4/2021 | Wei et al. | |
| 11,032,293 B2 | 6/2021 | Biyani et al. | |
| 11,057,345 B2 | 7/2021 | Whittle et al. | |
| 11,057,346 B2 | 7/2021 | Woolfe et al. | |
| 11,323,269 B2 | 5/2022 | Cao et al. | |
| 2017/0180134 A1 * | 6/2017 | King | ................... H04L 63/0876 |
| 2017/0366348 A1 * | 12/2017 | Weimer | ............... H04L 9/0618 |
| 2019/0318338 A1 * | 10/2019 | Verma | ................... H04L 9/0637 |
| 2020/0213306 A1 | 7/2020 | Thomsen | |
| 2020/0252202 A1 | 8/2020 | Madl et al. | |
| 2024/0275607 A1 * | 8/2024 | Yarabolu | ............... H04L 9/0618 |

* cited by examiner

*Primary Examiner* — Ponnoreay Pich

(74) *Attorney, Agent, or Firm* — Banner & Witcoff, Ltd.

(57) ABSTRACT

A simplified IoT network validation process includes improvements to enrollment of IoT devices onto the IoT network and authentication of active IoT devices during IoT network operation. A random cipher text is created upon device enrollment and shared to each device in the network. Additionally, a random peer-to-peer cross reference communication pattern is established among the devices. Using a device pairing sequence an iterated (e.g., chained) hash value is generated and stored at the server. During the device authentication, upon basic authentication of the request, a server shares a random point to the network (e.g., a randomly selected IoT device) to trigger the hash token generation process. The network devices perform hash token iteration as a ring. Each IoT device uses the previous hash when generating the next hash. The final hash is sent to the server for validation and comparison against stored keys.

20 Claims, 7 Drawing Sheets

CROSS CHAINED AGGREGATED HASH TOKEN VALIDATION SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage its computer systems, and particularly manage how internal computer systems exchange information with external computer systems in providing and/or supporting different products and services offered by the organization.

Intelligent computing devices capable of cross communication via a localized communication network (e.g., the Internet of Things (IoT) are becoming more common. As such, IT adoption is drastically increasing in all aspects of a technological environment. These devices capture live data for real-time analytics and decision making. As such, IoT may be the foundation for the implementation of digital transformation using disruptive technologies like digital twins and a metaverse. However, the security mechanisms used by IoT devices may be at risk of tampering by malicious actors because the security methods have not matured. As such, IoT devices may be at risk of device hijacking, tampering and/or manipulation of the captured data. In some cases, a malicious actor may replace a valid IoT device with a malicious IoT device on an IoT network. In doing so, the malicious IoT device may allow the malicious actor to tamper with the IoT data collected on the network, copy and/or communicate the data to an unauthorized computing device, and the like. An analogy to this type of tempering example may be seen in a boiler system where, if the heat sensors share incorrect data, the boiler system may not detect symptoms leading to a failure, such as an overheating situation, where the faulty data may ultimately cause the boiler system to fail. In a real-world IoT system, if an IoT device collecting authentication data (e.g., biometric authentication data) would be replaced with a malicious device, a secure computing system (e.g., an automated teller machine center and the like) may be at risk of unauthorized use, data destruction or other malicious activities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification of malicious IoT devices inserted into or otherwise replacing valid IoT devices within an IoT network.

Aspects of the disclosure relate to computer hardware and software. In particular, one or more aspects of the disclosure generally relate to computer hardware and software for securing a communication network, and more specifically, to providing simplified IoT network validation processes.

A simplified IoT network validation process may include improvements to enrollment of IoT devices onto the IoT network and authentication of active IoT devices during IoT network operation. During enrollment of an IoT device onto the IoT network, a random cipher text may be created and shared to each device in the network. Additionally, a random peer-to-peer cross reference communication pattern may be established among the devices. Using the established block sequence, and from each reference point (e.g., each IoT device), an iterated (e.g., chained) hash value may be generated and stored at the server. During the device authentication, upon basic authentication of the request, a server shares a random point to the network (e.g., a randomly selected IoT device) to trigger the Hash Token generation process. Once triggered, the network devices will begin the hash token iteration until completing the process at the starting point, completing a circle of the network. At each step, the IoT device uses the previous hash as hash-salt to generate the next hash. The final hash after completing all iterations is sent to the server for validation. It is compared against stored keys during enrollment and other authentication attempts.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
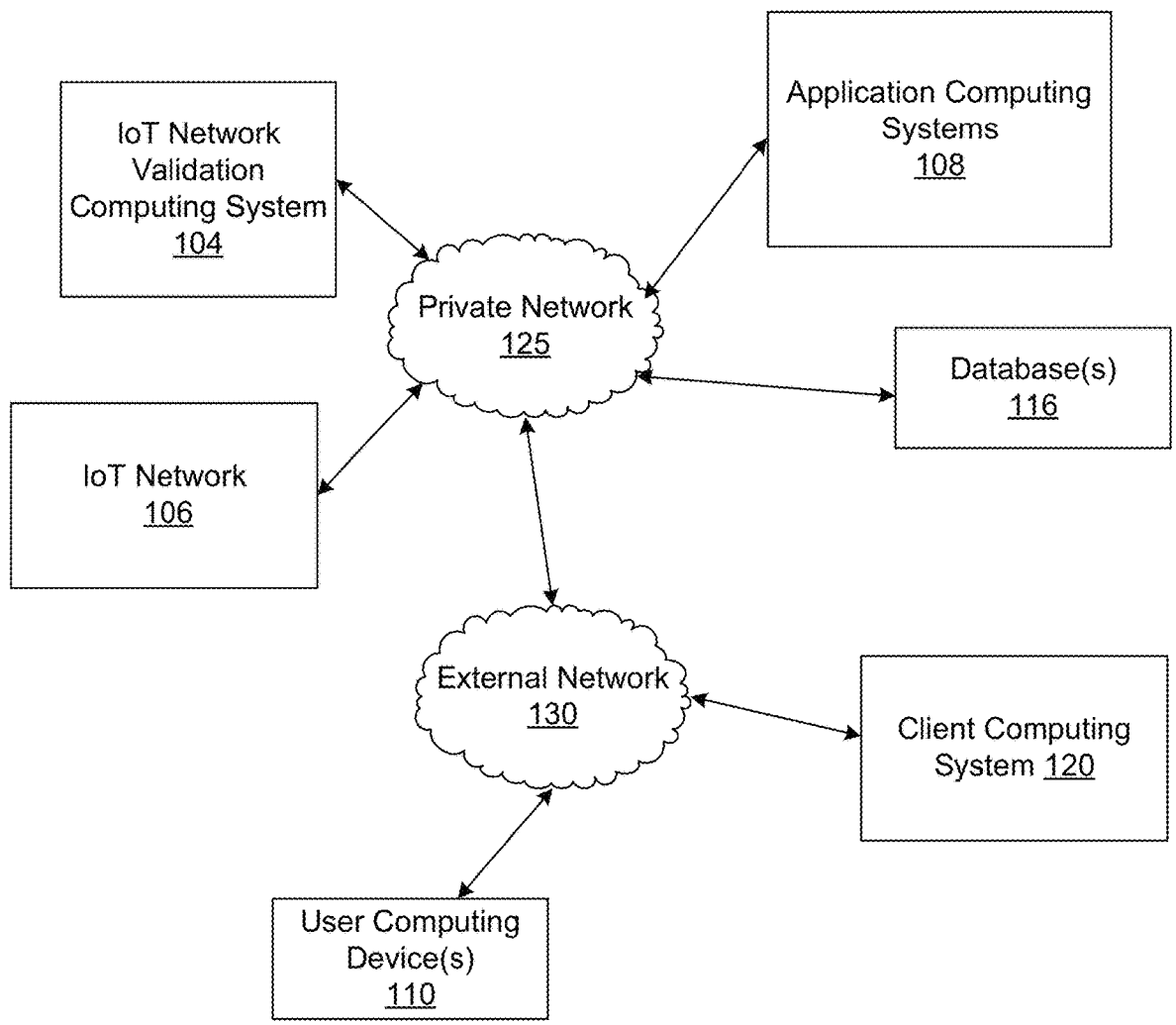
FIG. 1A shows an illustrative computing environment for cross chaining of aggregated hash tokens for validation of an Internet of Things (IoT) network, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Aspects of this disclosure describe simplified IoT network validation using a single hash key, no matter how many IoT devices are connected in the IoT network. A secure random hash key may be created by iterating from a random point (e.g., a randomly selected IoT device on the IoT network), full circle back to the starting point by using each hash value as hash-salt for next hash generation. In doing so, the cross chained aggregated hash token validation system provides a quick and efficient way to verify the complete network integrity in one simple process. Additionally, the cross chained aggregated hash token validation system provides a network that is virtually impossible to disconnect, replace, and/or hijack a legitimate IoT device in the IoT network.

FIG. 1A shows an illustrative computing environment 100 providing a cross chained aggregated hash token validation system, such as for an IoT network, in accordance with one or more arrangements. The computing environment 100 may comprise one or more devices (e.g., computer systems, communication devices, and the like). The computing environment 100 may comprise, for example, an IoT network validation computing system 104, an IoT network, one or more application computing systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the IoT network validation computing system 104 as a separate computing system, aspects of the IoT network validation computing system 104 may be incorporated into one or more different computing devices and/or systems including a device or devices on the IoT network 106 and/or the application computing systems 108.

The IoT network validation computing system 104 may comprise one or more computing devices and/or other computer components (e.g., processors, memories, communication interfaces) configured to perform one or more functions as described herein. Further details associated with the architecture of the IoT network validation computing system 104 are described with reference to FIG. 1B.

The IoT network 106 may include various IoT enabled devices that may be associated with particular users or owners of the IoT devices within the IoT network. For instance, the IoT network 106 may include one or more IoT enabled devices such as a refrigerator, IoT a smart thermostat, a washing machine an outdoor floodlight security camera, and a streaming music player. In some cases, the IoT enabled device may include one or more other device that may comprise or include a biometric sensor or other security feature. The use of any of these IoT devices or combinations of IT devices may be used in part to determine the identity of a user of a current or future transaction. For instance, a credit card authorization request made at a remote location may be questioned if IoT device interactions indicate that the user is currently and/or has recently utilized IoT devices at a second location that is different from the remote location of the credit card authorization request. The discrepancy in user location may indicate that the transaction has not been initiated by the user. In an embodiment, a determined inconsistency or discrepancy in user location at the time of credit card transaction may prompt a communication to the user to confirm authentication of the transaction or in some instances denial of the credit card transaction. While the IoT network 106 is shown to be communicatively coupled to the private network 125, the IoT network 106 may be coupled to the external network 130 or both the private network 125 and the external network 130.

In some cases, numerous unique digital constellations may be generated and associated with users, where the digital constellation may comprise all or a portion of the IoT network 106. The unique digital constellations may comprise interactions with different IoT devices during different time periods and/or at same geographical location. For instance, a user may weekdays between 7:00 pm and 9:00 pm interact with particular IoT devices in their home. In an embodiment, a user may during this time period normally utilize streaming music player IoT device, smart led light IoT device, and smart IoT user device. In an embodiment, the utilization of these three IoT devices during that particular time period may be determined to be constellation pattern number 1 associated with the user. The IoT validation computing system 104 may determine numerous constellations associated with a user.

The application computing systems 108 and/or the client computing system 120 may comprise one or more computing devices and/or other computer components (e.g., processors, memories, communication interfaces). In addition, the application computing system 108 and/or the client computing system 120 may be configured to host, execute, and/or otherwise provide one or more enterprise applications. In some cases, the application computing system 108 and/or the client computing system 120 may host one or more services configured facilitate operations requested through one or more API calls, such as data retrieval and/or initiating processing of specified functionality. In some cases, the client computing system 122 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The application computing system 108 and/or the client computing system 120 may comprise various servers and/or databases that store and/or otherwise maintain account information, such as financial account information including account balances, transaction history, account owner information, and/or other information. In addition, the application computing system 108 and/or the client computing system 120 may process and/or otherwise execute transactions on specific accounts based on commands and/or other information received from other computer systems comprising the computing environment 100. In some cases, one or more of the application computing system 108 and/or the client computing system 120 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, the application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application systems 108, such as via the services 109. For example, the services may be configured to facilitate data communications (e.g., data gathering functions, data writing functions, and the like) between the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125. In some cases, one or more user devices 110 may be or may include an IoT device capable of communication on the IoT network 106.

The database(s) 116 may comprise one or more computer-readable memories storing information that may be used by the IoT validation computing system 104. For example, the database(s) 116 may store hash values, device numbers, rotation sequences, and the like. In an arrangement, the database(s) 116 may be used for other purposes as described herein. In some cases, the client computing system 120 may write data or read data to the database(s) 116 via the services.

In one or more arrangements, the IoT validation computing system 104, the IoT network 106, the application computing systems 108, the databases 116, the client computing system 120, the user devices 110, and/or the other devices/systems in the computing environment 100 may be any type of computing device capable of receiving input via a user interface, and communicating the received input to one or more other computing devices in the computing environment 100. For example, the IoT validation computing system 104, the IoT network 106, the application computing systems 108, the databases 116, the client computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the IoT validation computing system 104, the IoT network 106, the application computing systems 108, the databases 116, the client computing system 120, the user devices 110, and/or the other devices/systems in the computing environment 100 may, in some instances, be and/or comprise special-purpose computing devices configured to perform specific functions.

Figure 1B:
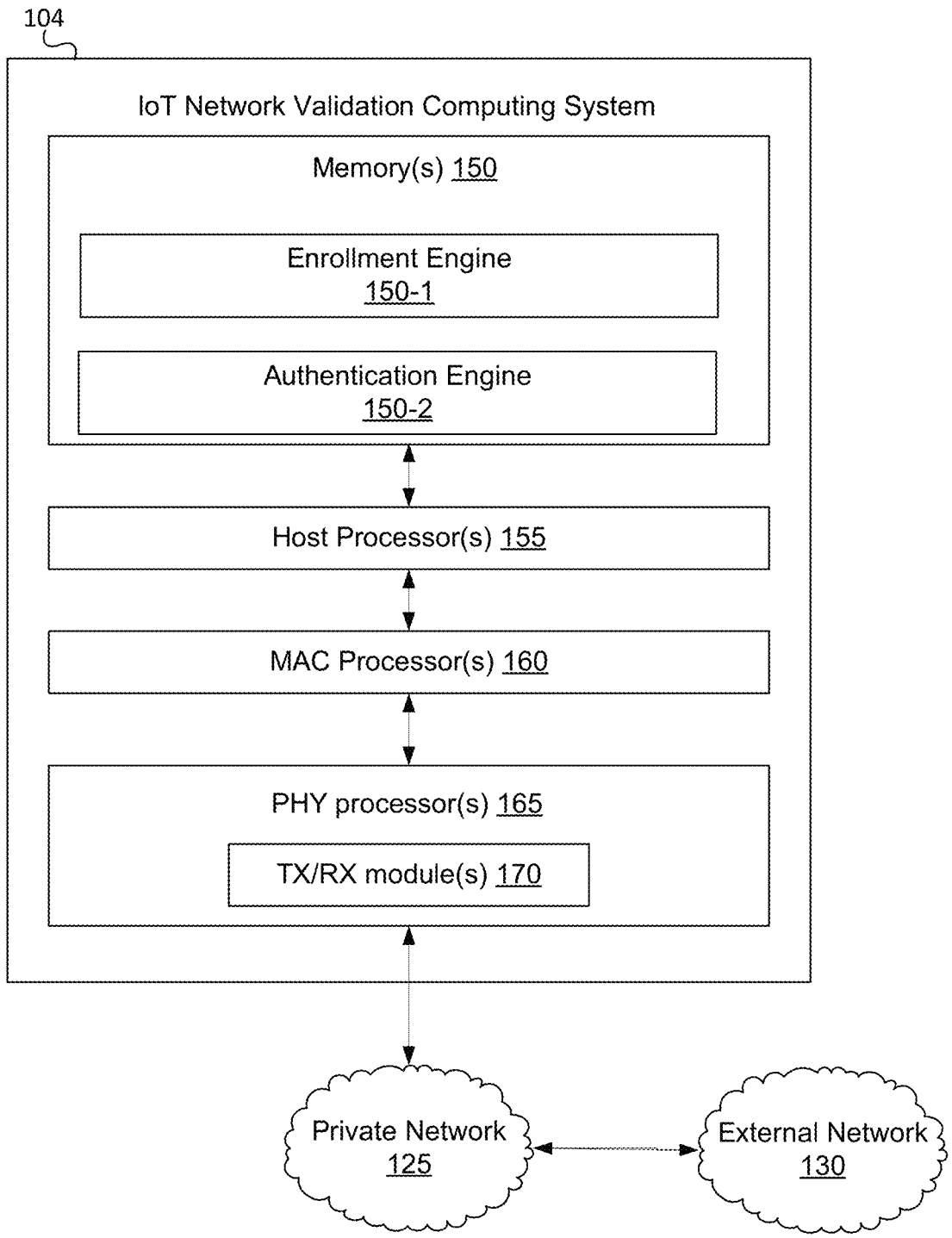
FIG. 1B shows an illustrative computing platform enabled for cross chaining of aggregated hash tokens for validation of an Internet of Things (IoT) network, in accordance with one or more aspects described herein.

FIG. 1B shows an illustrative IoT validation computing system 104 in accordance with one or more examples described herein. The IoT validation computing system 104 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The IoT validation computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the IoT validation computing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the IoT validation computing system 104 may be configured to execute machine readable instructions stored in memory 150. The memory 150 may comprise (i) one or more program modules/engines having instructions that when executed by the one or more processors cause the IoT validation computing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the IoT validation computing system 104 and/or by different computing devices that may form and/or otherwise make up the IoT validation computing system 104. For example, the memory 150 may have, store, and/or comprise an enrollment engine 150-1 and an authentication engine 150-2 and/or the like. The enrollment 150-1 may have instructions that direct and/or cause the IoT validation computing system 104 to perform one or more operations associated with enrollment of IoT devices in a cross chained aggregated hash token validation system and the like. The authentication engine 150-2 may have instructions that may cause the the IoT validation computing system 104 to perform one or more operations associated with authentication of IoT devices in a cross chained aggregated hash token validation system and the like.

While FIG. 1A illustrates the IoT network validation computing system 104, the IoT network 106, and/or the application computing systems 108, as being separate elements connected in the private network 125, in one or more other arrangements, functions of one or more of the above may be integrated in a single device/network of devices. For example, elements in the IoT network validation computing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, IoT network 106 and/or the application computing systems 108.

Figure 2:
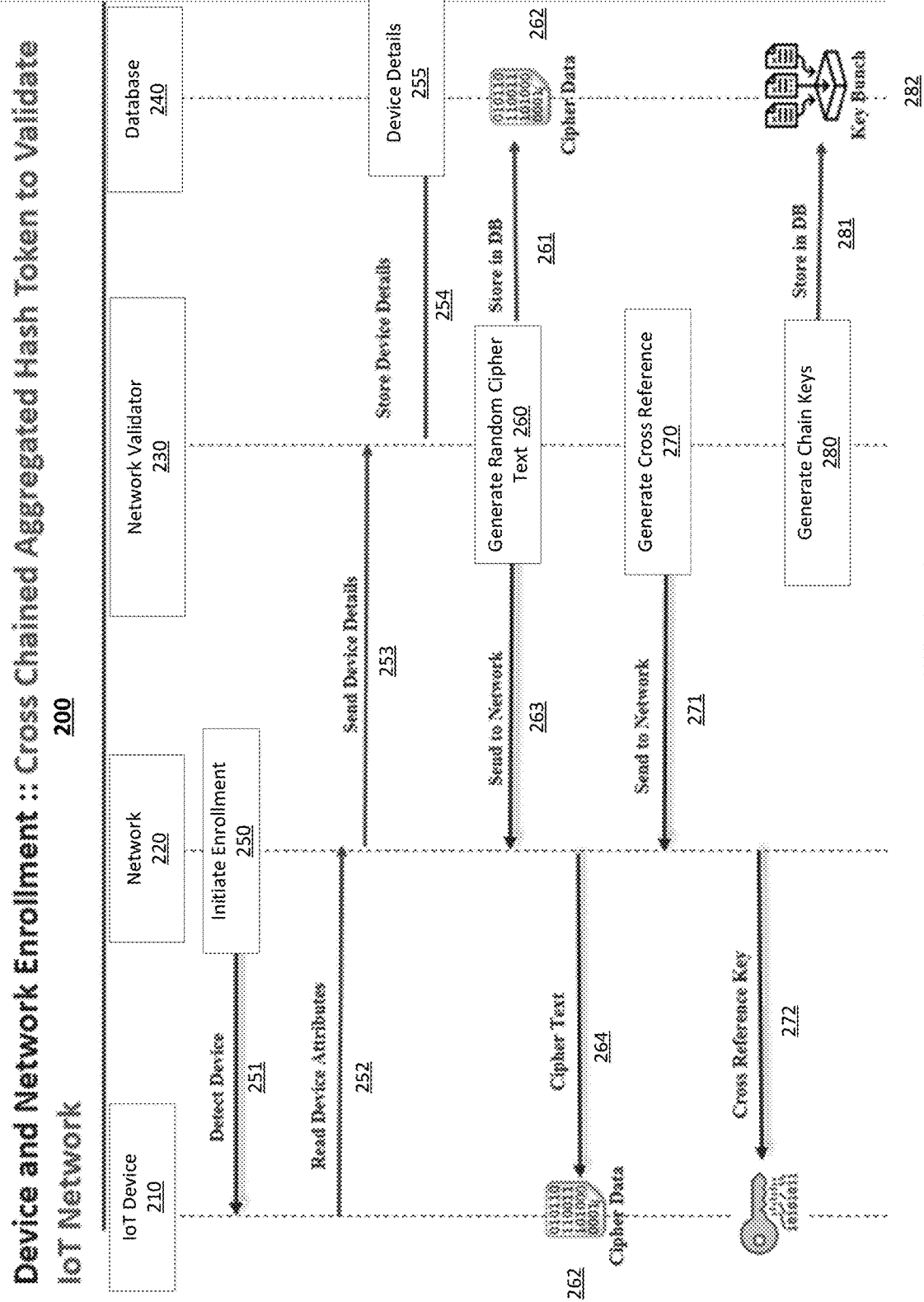
FIG. 2 shows an illustrative process of enrollment of IoT devices creating a cross chained aggregated hash token in accordance with one or more aspects described herein.

FIG. 2 shows an illustrative process 200 of enrollment of IoT devices creating a cross chained aggregated hash token in accordance with one or more aspects described herein. The process 200 includes operation of one or more IoT devices (e.g., an IoT device 210) being enrolled on a network 220, where the network may be managed by another IoT device or another computing device (e.g., a server, a host device, and the like). Also involved, may be a computing device configured to act as a network validator 230 and/or processing instructions to enable operation of a network validation engine which may be communicatively coupled to a database 240 (e.g., one or more of the databases 116).

At 250, the network controller may initiate an enrollment process of an IoT device when the IoT device 210 has been detected by the network 220. At 252, in response to a device detection process (e.g., a device handshaking, a device identification process, and the like), the IoT device may provide device attributes associated with the IoT device 210 to the network controller. These device attributes may then be communicated or otherwise sent to the network validator 230 at 253, where the device details 255 associated with the IoT device 210 are stored in the database 240 at 254. At 260, the network validator 230 may generate random cipher text for use in generating a cross chained aggregated hash token for the IoT network 220. At 263, the network validator communicates the random cipher text to via the network 220 to the IoT device at 265 to be stored as cipher data on the IoT device. At 270, the network validator then initiates cross communication between IoT devices on the IoT network 220 by sending the generated cross reference information (e.g., a device pairing data set pairing cross communication between devices on the network 220 as a ring) at 271. Each IoT device stores a cross-reference key at 272. At 280, the network validator 230 may then generate the chain keys at 280, based on the cross reference keys of each IoT device on the network 220, and the network validator 230 may store the chain keys as a key bunch 282 associated with the current configuration of the IoT network 220, at 281.

Figure 3:
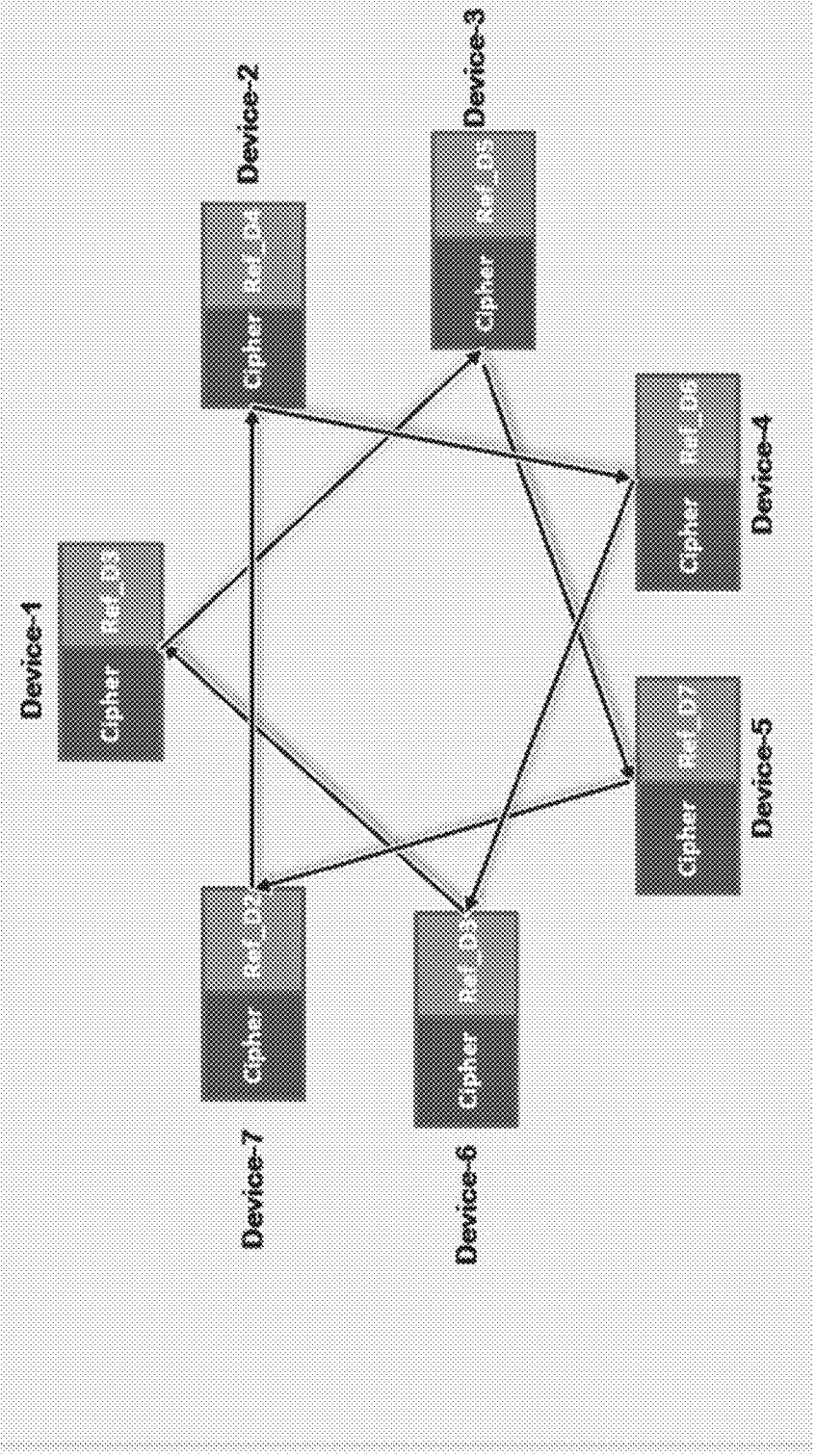
FIG. 3 show an illustrative IoT network, in accordance with one or more aspects described herein.

FIG. 3 show an illustrative IoT network, in accordance with one or more aspects described herein. Here the IoT chain network is shown with 7 devices, (e.g., Device-1-Device-7). Each device stores unique cipher text associated with the particular device, along with a reference to another paired device. Here, the pairings are represented by arrows between paired devices, where each device on the IoT network is cross-chained with another device, to close a ring. For example, Device-1 may be paired with Device-3, Device-3 may be paired with Devices-5, and so on until Device-6 is paired with Device-1 to close the ring. In some cases, the pairings may be randomly selected each time a cross-chaining request has been initiated (e.g., such as during an initialization process of the ring, addition or subtraction of a device from the network, and the like). In some cases, this process may be initiated automatically upon an event detection, such as on power up, addition of a new device, removal of a device from the network, upon a periodic basis, in response to an event trigger, and/or the like.

Figure 4:
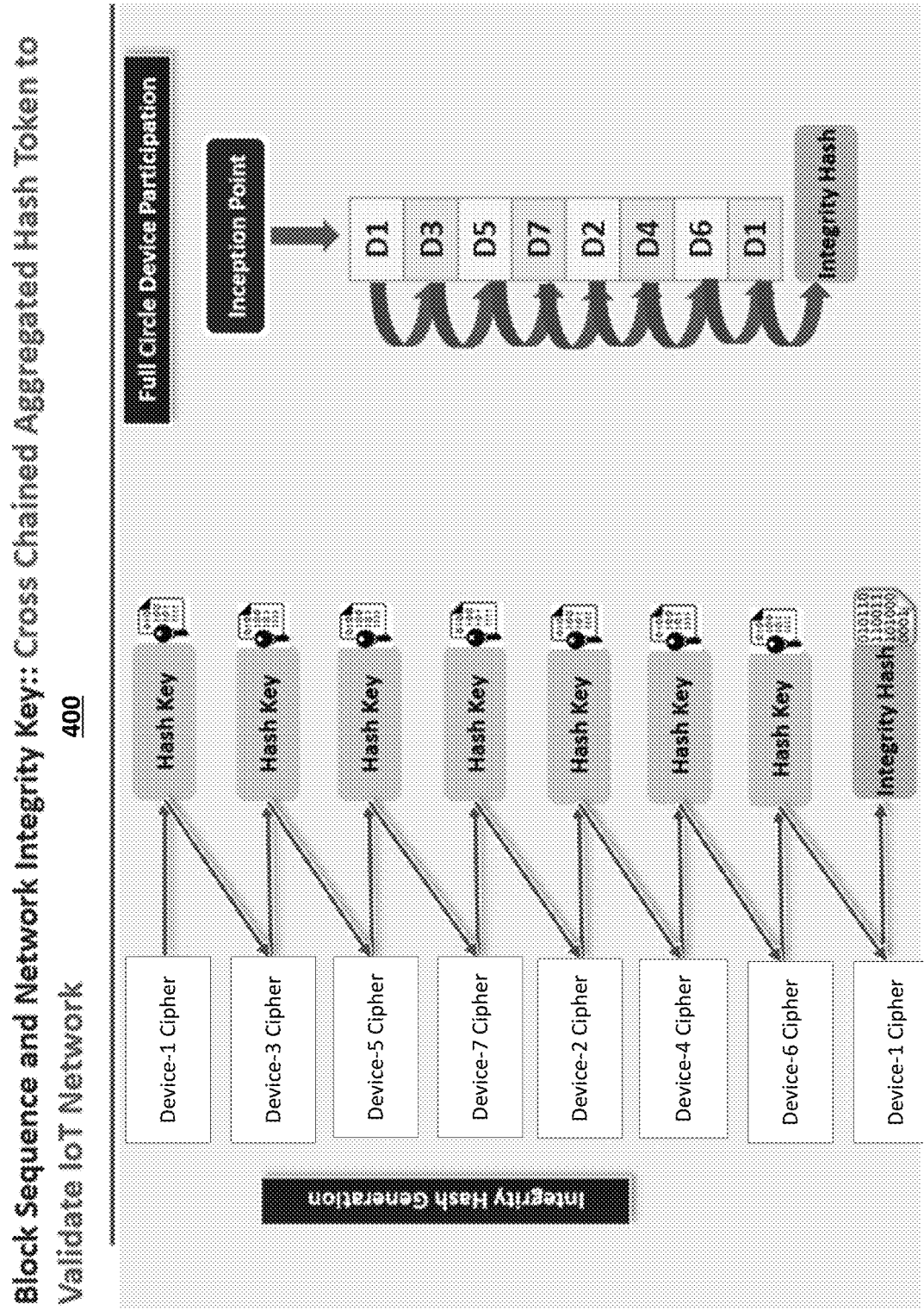
FIG. 4 shows an illustrative process for generation of a network integrity key in accordance with one or more aspects described herein.

FIG. 4 shows an illustrative process 400 for generation of a network integrity key in accordance with one or more aspects described herein. The process 400 may be automatically initiated upon an IoT network event, such as a power-on event, detection of a device addition, detection of a device removal. In some cases, the process 400 may be automatically initiated upon successful completion of an enrollment event for a new device, such as a completion of the process 200. Here, each device may generate a hash key based on the device's initial hash (e.g., for the IoT device initiating the process, such as Device-1) and/or based on the device's stored cipher text and the hash key of the preceding IoT device on the IoT network Ring. Such cross communication may be processed in a ring-fashion, for example, for the network shown in FIG. 3. As shown, each device on the ring generates a unique hash based on it's assigned cipher text (stored locally) and the previous devices generated hash (e.g., communicated from the preceding paired device. Here, Device-1 is shown to initiate the process by generating a hash based on its unique cipher text and to complete the process by generating the integrity hash for the entire ring based on the preceding hash value calculated by the device paired with it to complete the ring, here shown to be Device-6. In doing so, full circle participation is ensured so that each device known to and/or active on the IoT network participates in generating the integrity hash, which is then stored for comparison with future generated hashes to ensure network integrity. In some cases, the process may be performed upon a device addition or removal, upon power up, and/or based on a specified time elapsed, in response to an event trigger, and/or on a periodic basis. If a device is inserted to mimic or otherwise replace a known device on the network, a resulting integrity hash will not match the stored integrity hash, and the procedure fails. At such time, the network validator may trigger a remedial action, such as identifying a device that caused the disruption, disabling the problematic device, initiating a new generation of the cross chained aggregated hash token (e.g., the integrity token) for the IoT network without the problematic device being included in the network, triggering an alert, disabling the network and/or the like.

Figure 5:
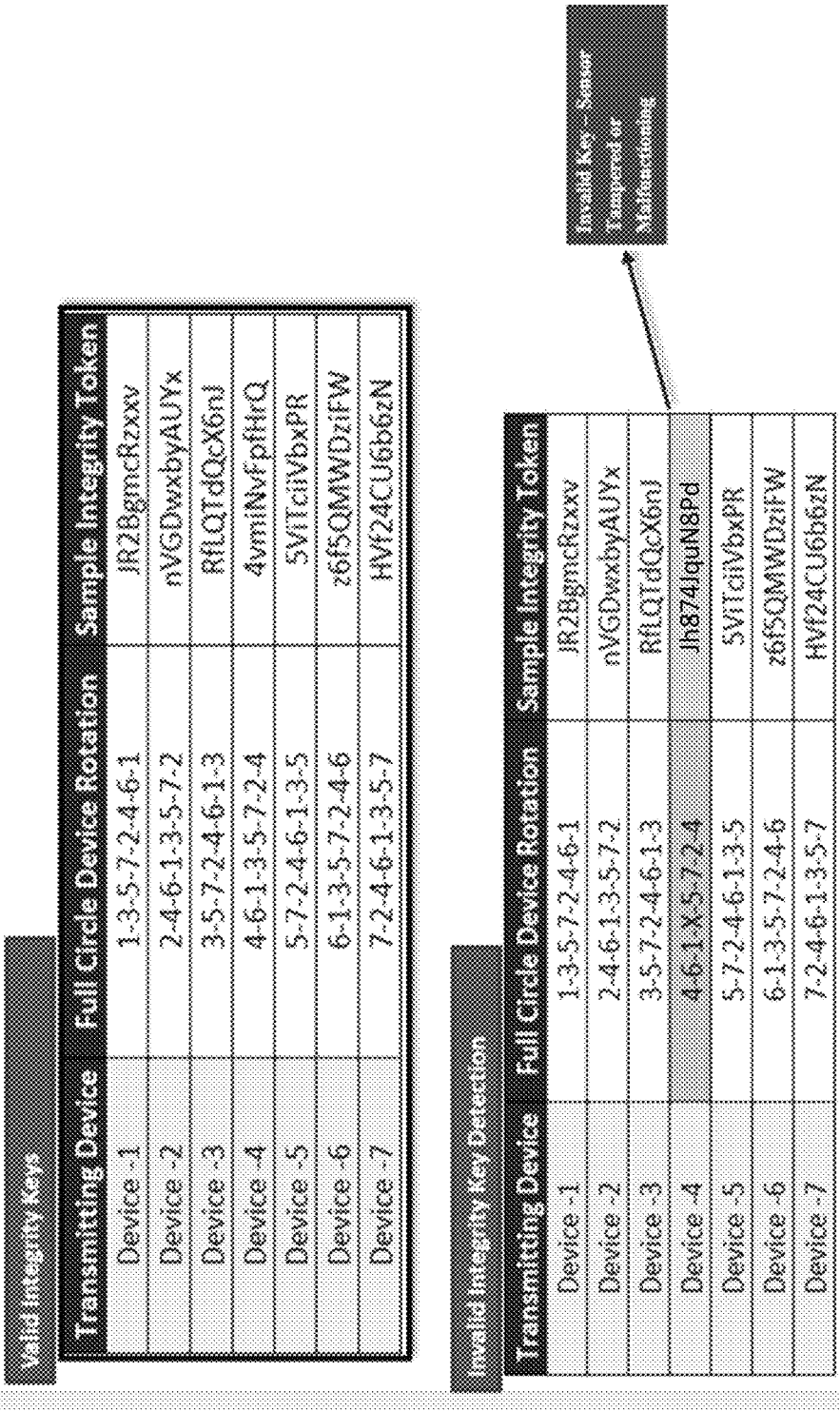
FIG. 5 shows an illustrative chart showing an identification of a substituted IoT device on the IoT network according to one or more aspects described herein.

FIG. 5 shows an illustrative chart showing an identification of a substituted IoT device on the IoT network according to one or more aspects described herein. As can be seen, a problematic device (e.g., Device-4) can be found due to generation and/or storage of an invalid hash on the problematic device. Here, the generated integrity key generated based on the information of the first table would differ from an integrity key generated based on the information of the second table, due to the unexpected integrity token stored on the problematic device. Upon identification, the suspect device may be isolated from the network, and other process may be automatically triggered such as to disable the network, trigger an alert either visually, audible or both, restart the network without the problematic device (e.g., quarantine the Device-4) to ensure the device is removed and is not receiving communications on the network, and the like.

Figure 6:
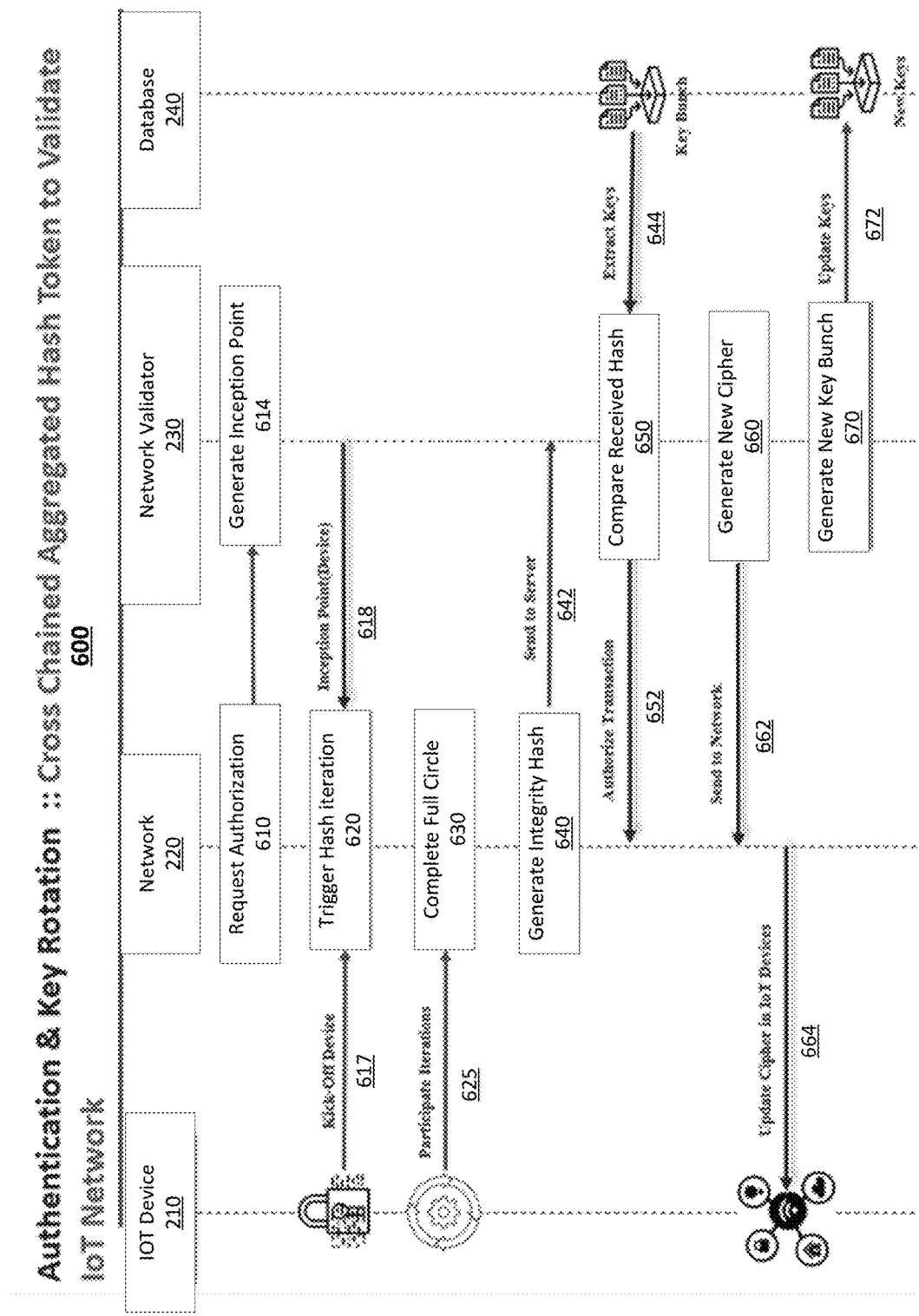
FIG. 6 shows an illustrative process of authentication and key rotation in accordance with one or more aspects described herein.

FIG. 6 shows an illustrative process 600 of authentication and key rotation in accordance with one or more aspects described herein. The process 600 includes operation of one or more IoT devices (e.g., an IoT device 210) being enrolled on a network 220, where the network may be managed by another IoT device or another computing device (e.g., a server, a host device, and the like). Also involved, may be a computing device configured to act as a network validator 230 and/or processing instructions to enable operation of a network validation engine which may be communicatively coupled to a database 240 (e.g., one or more of the databases 116).

At 610, a network controller, or other device, may request authorization of the IoT network devices communicating on the network 220. For example, the network controller may request authorization of the network devices (e.g., the IoT devices on the IoT network 220 including IoT device 210) from the network validator 230. At 614, the network validator may generate an inception point or other starting point (or device) to initiate the authorization process on the network 220. For example, the network validator 230 may define an inception point (e.g., identify which IoT device 210 is the starting point for the process, such as being identified as Device-1) to trigger hash iteration process 620 as discussed above. In some cases, Device-1 may be identified based on a previous process, may be pre-defined, or may be randomly assigned. In some cases, the IoT device 210 may initiate the hash iteration process 620 at 617, such as at after a predetermined time interval has elapsed.

At 625, each IoT Device 210 on the network 220 may participate in creation of the integrity hash token as discussed above until the full circle of devices has been completed at 630. At 640, the network controller, or the device indicated as Device-1 (e.g., the inception point) may generate the integrity hash token at 640 and communicate or otherwise send the integrity hash token, along with the other generated keys for each device, to the network validator 642 for validation. At 650, the network validator may extract the key bunch from the database 240 associated with the ring, where the network validator may compare the generated integrity hash with the stored integrity hash. If the integrity keys match, the network is authenticated at 652, otherwise the network validator 230 initiates a failure procedure, where each key from each IoT device may be compared with the stored hash to identify which device or devices has caused the network failure as shown n FIG. 5. Once the network has received the authorization to continue communication (or when the faulty device has been removed or otherwise isolated from network communications), the network validator generates a new cipher at 660, sends the new cipher to the network at 662 to be used at 664 in generation of a new integrity key, as discussed above. Once completed, the network devices communicate the integrity key and the newly created keys associated with each IoT device 210 on the network 220 to the network validator 230. When received, the network validator 230 generates a new key bunch at 670 and updates the key information in the database 240 such as by generating a new key bunch entry or updating an existing key bunch associated with the present network topology.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
   an Internet of Things (IoT) network comprising a plurality of IoT devices;
   a network validator comprising:
      a processor; and
      non-transitory memory storing instructions that, when executed by the processor, cause the network validator to
      generate, based on receipt of first information from a first IoT device identified on the IoT network, random cipher text associated with the first IoT device;
      send, via the IoT network and to the first IoT device, the random cipher text;
      send, via the IoT network and to the first IoT device, device cross reference information, wherein the device cross reference information corresponds to a different IoT device of the plurality of IoT devices on the IoT network;
      initiate, by the plurality of IoT devices on the IoT network and based on the random cipher text and the device cross reference information of the first IoT device, generation of an integrity hash key associated with the plurality of IoT devices of the IoT network;
      receive, via the IoT network, the integrity hash key; and
      store, in a data repository, the integrity hash key.

2. The system of claim 1, further comprising the first IoT device comprises
   a second processor; and
   second non-transitory memory storing second instructions that, when executed by the processor, cause the first IoT device to:
      store the random cipher text and the device cross reference information in memory; and
      generate, based on the random cipher text and an existing hash key received from a preceding IoT device, a first hash key associated with the first IoT device.

3. The system of claim 2, wherein the second instructions further cause the first IoT device to send, to a second IoT device, the first hash key.

4. The system of claim 1, wherein the instructions further cause the network validator to:
generate, based on an authorization request received from the IoT network, an indication that a third IoT device of the plurality of IoT devices is an inception point of a communication ring comprising the plurality of IoT devices;
send, to the IoT network, the indication that the third IoT device is an inception point device; and
initiate, based on sending of the indication, generation of the integrity hash key.

5. The system of claim 1, wherein the instructions further cause the network validator to:
receive, from the IoT network, a first key bunch comprising hash keys associated with each IoT device on the network and the integrity hash key associated with the plurality of IoT devices;
compare the first key bunch with a second key bunch stored in a data store; and
trigger an error response when a difference is identified between a first integrity hash key of the first key bunch and a second integrity hash key of the second key bunch, an IoT network error response procedure.

6. The system of claim 5, wherein the first key bunch is received periodically.

7. The system of claim 5 wherein the first key bunch is generated on the IoT network periodically.

8. The system of claim 5, wherein the key bunch is generated based on addition of a new IoT device to the IoT network.

9. The system of claim 5, wherein the key bunch is generated based on removal of an existing IoT device from the IoT network.

10. The system of claim 1, wherein the instructions further cause the network validator to:
compare, periodically, a first key bunch received from the IoT network with a second key bunch stored in a data store; and
trigger an error response when a difference is identified between a first integrity hash key of the first key bunch and a second integrity hash key of the second key bunch, an IoT network error response procedure.

11. The system of claim 1, wherein the instructions further cause the network validator to:
compare, based on triggering of an error response, each hash key of a first key bunch to a corresponding hash key of a second key bunch; and
identify, based on an identified unmatched hash key of the first key bunch, a suspect IoT device.

12. The system of claim 11, wherein the error response comprises disabling communication on the IoT network.

13. The system of claim 11, wherein the error response comprises disabling the suspect IoT device.

14. The system of claim 11, wherein the error response comprises isolating the suspect IoT device from the IoT network.

15. The system of claim 11, wherein the error response comprises disabling the suspect IoT device and triggering a reauthentication procedure of a second plurality of IoT devices remaining active on the IoT network after disabling of the suspect IoT device.

16. An apparatus comprising:
a processor; and
non-transitory memory storing instructions that, when executed by the processor, cause a network validator of the apparatus to
generate, based on receipt of first information from a first Internet of Things (IoT) device identified on an IoT network comprising a plurality of IoT devices, random cipher text associated with the first IoT device;
send, via the IoT network and to the first IoT device, the random cipher text;
send, via the IoT network and to the first IoT device, device cross reference information, wherein the device cross reference information corresponds to a different IoT device of the plurality of IoT devices on the IoT network;
initiate, by the plurality of IoT devices on the IoT network and based on the random cipher text and the device cross reference information of the first IoT device, generation of an integrity hash key associated with the plurality of IoT devices of the IoT network;
receive, via the IoT network, the integrity hash key; and
store, in a data repository, the integrity hash key.

17. The apparatus of claim 16, wherein the instructions further cause the network validator to:
compare, based on triggering of an error response, each hash key of a first key bunch to a corresponding hash key of a second key bunch; and
identify, based on an identified unmatched hash key of the first key bunch, a suspect IoT device.

18. The apparatus of claim 17, wherein the error response comprises disabling communication on the IoT network.

19. The apparatus of claim 17, wherein the error response comprises disabling the suspect IoT device.

20. The apparatus of claim 17, wherein the instructions further cause the network validator to:
receive, from the IoT network, a first key bunch comprising hash keys associated with each IoT device on the network and the integrity hash key associated with the plurality of IoT devices;
compare the first key bunch with a second key bunch stored in a data store; and
trigger an error response when a difference is identified between a first integrity hash key of the first key bunch and a second integrity hash key of the second key bunch, an IoT network error response procedure.

* * * * *